United States Patent
Zucal

(10) Patent No.: US 8,876,152 B1
(45) Date of Patent: Nov. 4, 2014

(54) INFLATABLE RESTRAINT DEPLOYMENT RAMP

(71) Applicant: Nissan North America, Inc., Franklin, TN (US)

(72) Inventor: James Zucal, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 13/897,525

(22) Filed: May 20, 2013

(51) Int. Cl.
  *B60R 21/213* (2011.01)
  *B60R 21/2334* (2011.01)
  *B60R 21/2165* (2011.01)

(52) U.S. Cl.
  CPC ......... *B60R 21/2334* (2013.01); *B60R 21/2165* (2013.01); *B60R 21/213* (2013.01)
  USPC ...................... 280/728.3; 280/730.2

(58) Field of Classification Search
  CPC ...... B60R 21/10; B60R 21/20; B60R 21/213; B60R 21/214
  USPC ...................................................... 280/730.2
  See application file for complete search history.

(56) References Cited

U.S. PATENT DOCUMENTS

| | | | | |
|---|---|---|---|---|
| 5,924,723 A * | 7/1999 | Brantman et al. | ......... | 280/730.2 |
| 6,224,087 B1 * | 5/2001 | Stutz et al. | ................. | 280/728.2 |
| 6,409,210 B1 * | 6/2002 | Emerling | .................... | 280/730.2 |
| 7,641,227 B2 * | 1/2010 | Choi | ........................... | 280/730.2 |
| 7,766,378 B2 * | 8/2010 | Miura et al. | ................ | 280/730.2 |
| 7,793,972 B2 * | 9/2010 | Downey | ..................... | 280/728.3 |
| 7,914,035 B2 * | 3/2011 | Davey et al. | ................ | 280/728.2 |
| 7,934,748 B2 * | 5/2011 | Torii | ........................... | 280/730.2 |
| 7,992,892 B2 * | 8/2011 | Jaramillo | ...................... | 280/729 |
| 2004/0227334 A1 * | 11/2004 | Chausset | .................... | 280/730.2 |
| 2008/0111354 A1 * | 5/2008 | Ryu | ........................... | 280/730.2 |
| 2009/0160165 A1 | 6/2009 | Torii | | |
| 2011/0089673 A1 * | 4/2011 | Glaser | ........................ | 280/730.2 |
| 2012/0119048 A1 * | 5/2012 | Kim et al. | .................. | 248/309.1 |
| 2013/0154243 A1 * | 6/2013 | Glaser et al. | ............... | 280/728.3 |

FOREIGN PATENT DOCUMENTS

| GB | 2 372 484 A | 8/2002 |
|---|---|---|
| JP | 1998/138858 | 5/1998 |
| JP | 2006/088833 | 4/2006 |

* cited by examiner

*Primary Examiner* — Nicole Verley
(74) *Attorney, Agent, or Firm* — Young, Basile, Hanlon & MacFarlane, P.C.

(57) ABSTRACT

An inflatable restraint assembly includes a vehicle pillar and a pillar trim component that is attached to the vehicle pillar, the pillar trim component having an upper end. A curtain airbag module has an inflatable curtain portion that is disposed in a stowed configuration prior to deployment and moves to a deployed configuration subsequent to deployment. A guide ramp is disposed between the inflatable curtain portion of the curtain airbag module and the upper end of the pillar trim component. A headliner has an outboard portion that is sandwiched between the guide ramp and the upper end of the pillar trim component prior to deployment of the inflatable curtain portion of the curtain airbag module.

19 Claims, 6 Drawing Sheets

INFLATABLE RESTRAINT DEPLOYMENT RAMP

FIELD OF THE INVENTION

The disclosure relates to the field of inflatable restraints for automobiles.

BACKGROUND

Inflatable restraint devices commonly called airbags are standard equipment on most new vehicles. In early implementations of airbag systems, vehicles were equipped with one or more airbags that would deploy from forward-facing regions such as the steering wheel and the passenger side of the instrument panel. In more recent implementations, additional airbags have been employed in different areas of the vehicle. For example, side-curtain airbags have been utilized to provide enhanced energy dissipation capacity along the sides of vehicles. Side-curtain airbags have been employed in areas adjacent to the roof rail and headliner or the side doors. These airbag devices are typically concealed from occupant view prior to deployment by the headliner and/or interior trim panels associated with the roof rail and/or pillar.

When an airbag is deployed, it is inflated with a gas, which pressurizes the airbag and induces surface tension in the material from which the airbag is fabricated. To ensure that the airbag deploys correctly, guide features are sometimes provided to allow the tensioned material to move in a desired manner with respect to adjacent vehicle structures, such as trim panels, structural pillars, windows, and seats.

SUMMARY

Inflatable restraint assemblies for use in vehicles are taught herein.

One aspect of the disclosed embodiments is an inflatable restraint assembly that includes a vehicle pillar and a pillar trim component that is attached to the vehicle pillar. The pillar trim component has an upper end. A curtain airbag module has an inflatable curtain portion that is disposed in a stowed configuration prior to deployment and moves to a deployed configuration subsequent to deployment. A guide ramp is disposed between the inflatable curtain portion of the curtain airbag module and the upper end of the pillar trim component. A headliner has an outboard portion that is sandwiched between the guide ramp and the upper end of the pillar trim component prior to deployment of the inflatable curtain portion of the curtain airbag module.

Another aspect of the disclosed embodiments is an inflatable restraint assembly that includes a vehicle pillar and a pillar trim component that is attached to the vehicle pillar. The pillar trim component has an upper end. A curtain airbag module is located adjacent to the upper end of the pillar trim component, the curtain airbag module having an inflatable curtain portion that is disposed in a stowed configuration prior to deployment and moves to a deployed configuration subsequent to deployment. A guide ramp is positioned adjacent to the vehicle pillar and is disposed between the inflatable curtain portion of the curtain airbag module and the upper end of the pillar trim component. A headliner conceals the inflatable curtain portion of the curtain airbag module when the inflatable curtain portion is in the stowed configuration and is separated from the upper end of the pillar trim component when the inflatable curtain portion of the curtain airbag module is in the deployed configuration. The headliner includes an outboard portion that is disposed between and in engagement with the guide ramp and the upper end of the vehicle pillar such that the guide ramp and the upper end of the pillar trim component cooperate to restrain movement of the outboard portion of the headliner prior to deployment of the inflatable curtain portion of the curtain airbag module.

Another aspect of the disclosed embodiments is an inflatable restraint assembly that includes a vehicle pillar having an upper portion and a lower portion and a pillar trim component that is attached to the vehicle pillar and conceals the lower portion of the vehicle pillar. The pillar trim component has an upper end. A curtain airbag module is located adjacent to the upper end of the pillar trim component. The curtain airbag module has an inflatable curtain portion that is disposed in a stowed configuration prior to deployment and moves to a deployed configuration subsequent to deployment. A guide ramp is disposed between the inflatable curtain portion of the curtain airbag module and the upper end of the pillar trim component. The guide ramp has an outboard end that is connected to the vehicle pillar and an inboard end. At least a portion of the inflatable curtain portion of the curtain airbag module extends along the guide ramp when the inflatable curtain portion is in the deployed configuration. A headliner conceals the inflatable curtain portion of the curtain airbag module when the inflatable curtain portion is in the stowed configuration and is separated from the upper end of the pillar trim component when the inflatable curtain portion of the curtain airbag module is in the deployed configuration. The headliner includes an outboard portion that is disposed between and in engagement with the inboard end of the guide ramp and the upper end of the vehicle pillar prior to deployment of the inflatable curtain portion of the curtain airbag module.

BRIEF DESCRIPTION OF THE DRAWINGS

The description herein makes reference to the accompanying drawings wherein like referenced numerals refer to like parts throughout the several views, and wherein.

DETAILED DESCRIPTION

Figure 1:
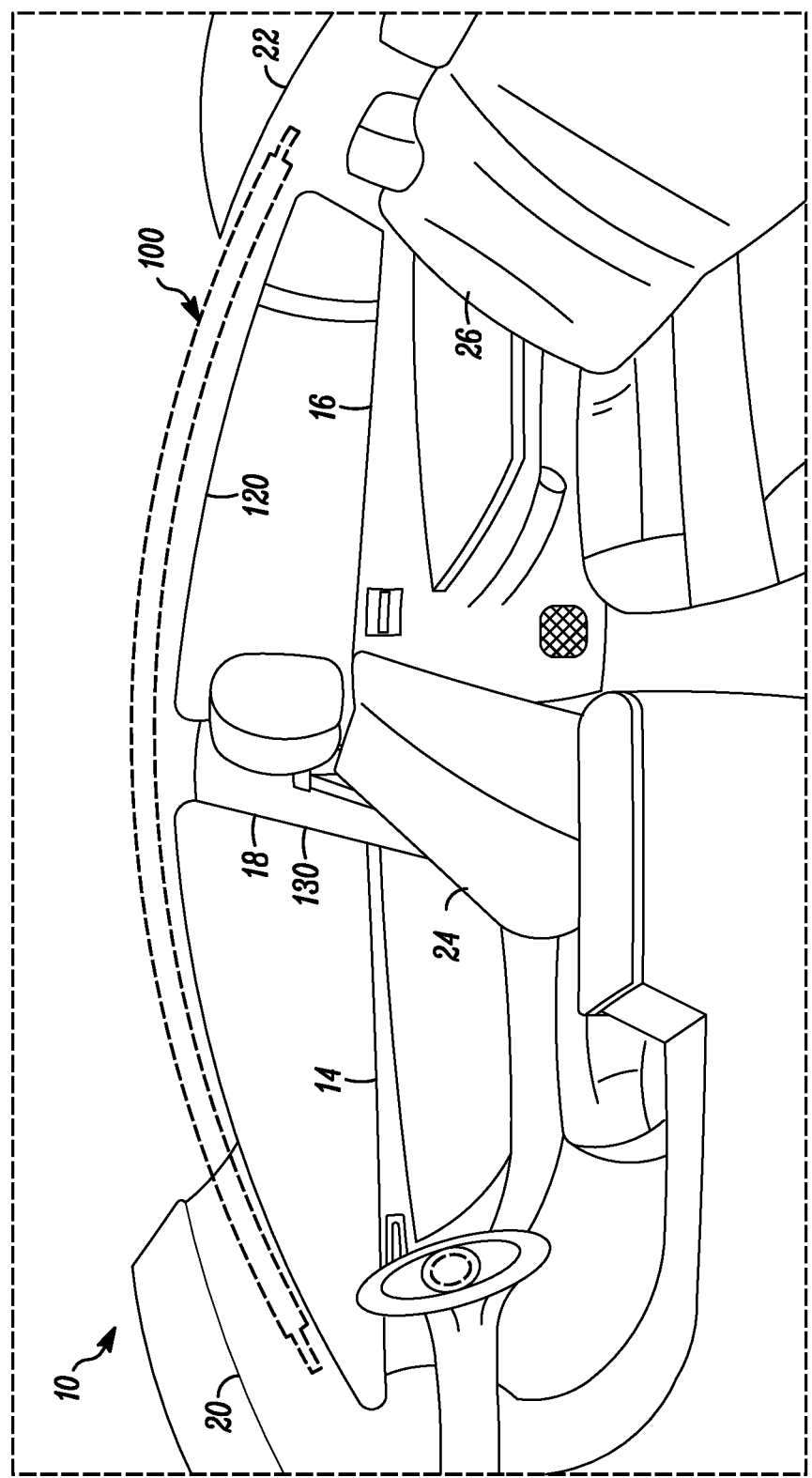
FIG. 1 is an illustration showing a vehicle equipped with a curtain airbag module.

FIG. 1 shows a vehicle 10 having a side impact restraint in the form of a curtain airbag module 100. The vehicle 10 may include a front door 14 and a rear door 16 that are separated from one another by an interior structural pillar or B-pillar 18 of the vehicle 10. A front structural pillar or A-pillar 20 is disposed forward of the front door 14. A rear structural pillar or C-pillar 22 is disposed rearward of the rear door 16. Front seats 24 are positioned adjacent to the front door 14, while rear seats 26 are positioned adjacent to the rear door 16. Of course, the vehicle 10 shown and described herein is not limiting of the invention, and the curtain airbag module 100 could be used with other vehicles 10, such as vehicles 10 that do not include a rear door 16 but include rear seats 26, or vehicles that lack both a rear door 16 and rear seats 26.

The curtain airbag module 100 includes one or more inflatable portions that are configured to inflate upon rapid deceleration of the vehicle 10 (e.g., during an impact event or other contact between the vehicle 10 and an exterior obstacle) to restrain motion of the occupants of the vehicle 10 with respect to the vehicle 10 and to dissipate energy from the force of the impact. The vehicle 10 can include sensors, controllers, and associated hardware (not shown) that sense an impact event, determine whether to deploy the airbag assembly in response to the impact event, and cause deployment of the curtain airbag module 100.

Prior to deployment, the curtain airbag module 100 is disposed at least partially behind a headliner 120 of the vehicle 10, in a pre-deployment position of the curtain airbag module 100. The curtain airbag module 100 extends underneath the headliner 120 along the longitudinal direction of the vehicle 10, just above the front door 14 and the rear door 16 as well as the B-pillar 18. The curtain airbag module 100 may extend at least partially along the length of both the A-pillar 20 and the C-pillar 22 of the vehicle 10.

Figure 2:
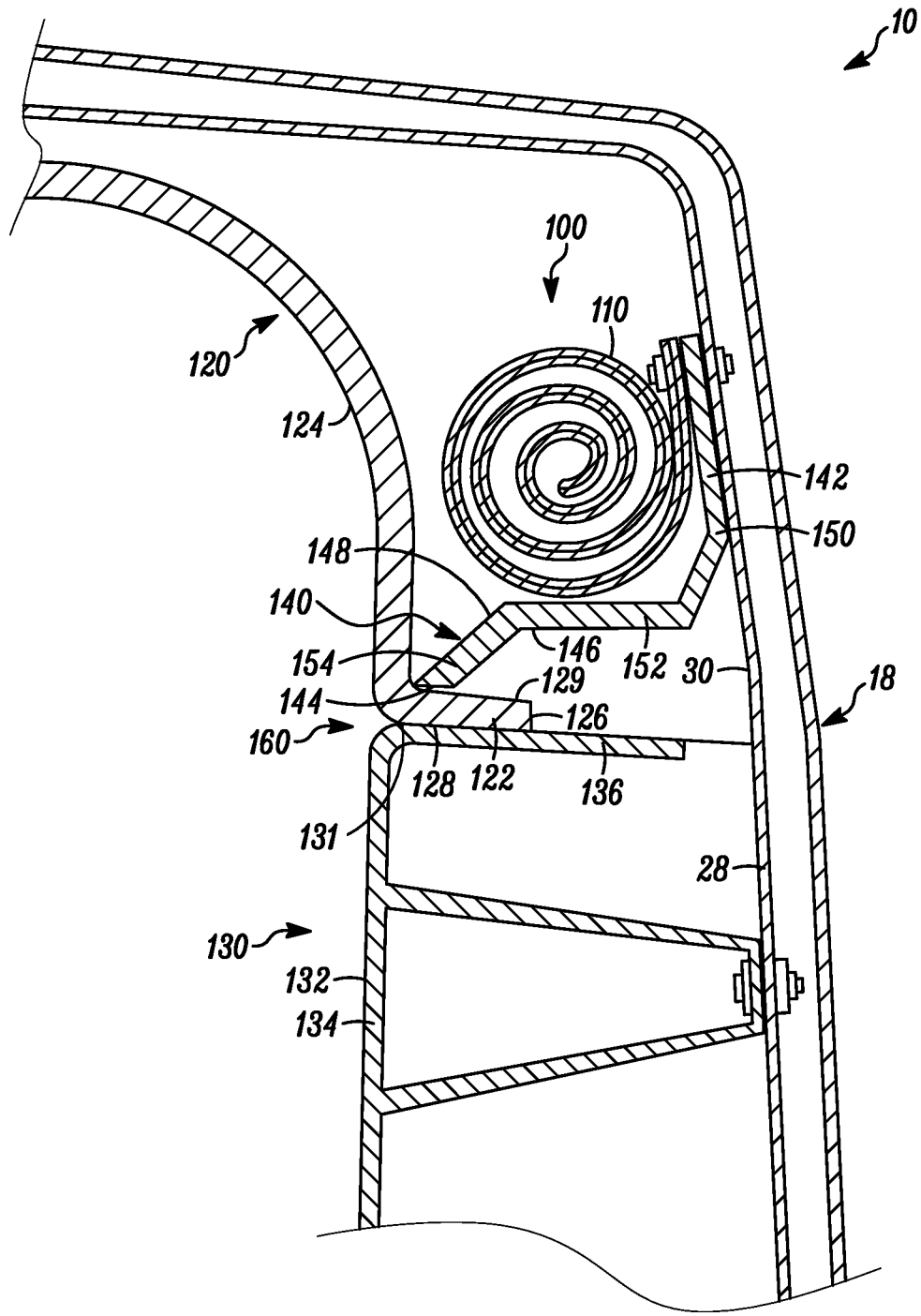
FIG. 2 is a front sectional view of the vehicle of FIG. 1 showing an inflatable curtain portion of the curtain airbag module in a pre-deployment stowed configuration.

To provide a finished appearance for the B-pillar 18 on the interior of the vehicle 10, a pillar trim component 130, which may also be referred to herein as a trim panel, is connected to and extends about the B-pillar 18. As best seen in FIG. 2, an inboard surface 132 of the pillar trim component 130 is formed on an outer wall 134 of the pillar trim component 130. An end wall 136 is disposed at an upper end 131 of the pillar trim component 130, and extends from the outer wall of the pillar trim component toward the B-pillar 18. The outer wall 134 of the pillar trim component 130 is spaced from the B-pillar 18, such that the outer wall 134 of the pillar trim component 130, the end wall 136 of the pillar trim component 130 and the B-pillar 18 cooperate to define a stepped configuration. The portion of the B-pillar 18 that is adjacent to the pillar trim component 130 is referred to herein as a lower portion 28 of the B-pillar 18, while the portion of the B-pillar 18 that is above the pillar trim component 130 is referred to herein as an upper portion 30 of the B-pillar 18.

The curtain airbag module 100 includes an inflatable curtain portion 110. The inflatable curtain portion 110 is disposed in a stowed configuration (FIG. 2) prior to deployment and moves to a deployed configuration (FIG. 3) subsequent to deployment. In the stowed configuration, the inflatable curtain portion 110 is concealed behind the headliner 120.

A guide ramp 140 is positioned adjacent to the inflatable curtain portion 110 of the curtain airbag module 100 and is connected to the upper portion 30 of the B-pillar 18. The guide ramp 140 extends from an outboard end 142 to an inboard end 144. The guide ramp 140 is connected to the upper portion 30 of the B-pillar 18 at the outboard end 142. The inboard end 144 of the guide ramp 140 is positioned adjacent to the headliner 120 when the inflatable curtain portion 110 is in the stowed configuration. The guide ramp 140 has a shape that is adapted to guide deployment of the inflatable curtain portion 110 when the inflatable curtain portion 110 moves from the stowed configuration to the deployed configuration. Although numerous geometries can be adapted for the guide ramp 140, generally, the outboard end 142 of the guide ramp 140 is spaced from the upper end 131 of the pillar trim component 130 by a distance that is greater than the spacing between the inboard end 144 of the guide ramp 140 with respect to the upper end 131 of the pillar trim component 130. In addition, a lower surface 146 of the guide ramp 140 faces the end wall 136 of the pillar trim component 130, while an upper surface 148 of the guide ramp 140 faces the inflatable curtain portion 110 of the curtain airbag module 100.

The guide ramp 140 can include three separate portions. The three portions of the guide ramp 140 can extend at angles with respect to one another. In particular, the guide ramp 140 can include an outboard support portion 150 that is connected to the B-pillar 18. The guide ramp 140 can also include an inboard support portion 152 that extends in an inboard direction from the outboard support portion 150. The guide ramp 140 can also include a ramp portion 154 that is angled with respect to the inboard support portion 152 toward the end wall 136 of the pillar trim component 130. Each of the outboard support portion 150, the inboard support portion 152, and the ramp portion 154 can be substantially planar members. The ramp portion 154 can guide the inflatable curtain portion 110 of the curtain airbag module 100 past the pillar trim component 130 during deployment of the inflatable curtain portion 110 of the curtain airbag module 100.

When the inflatable curtain portion 110 is in the stowed configuration, an outboard portion 122 of the headliner 120 is disposed between the inboard end 144 of the guide ramp 140 and the end wall 136 of the pillar trim component 130. The outboard portion 122 of the headliner 120 can meet a body portion 124 of the headliner 120 and extend at an angle with respect to the body portion 124. The outboard portion 122 can extend from the body portion 124 to a free end 126 of the headliner 120. The outboard portion 122 of the headliner 120 can be sandwiched between the inboard end 144 of the guide ramp 140 and the end wall 136 of the pillar trim component 130 such that an outer surface 128 of the headliner 120 is in engagement with the end wall 136 of the pillar trim component 130 and an inner surface 129 of the headliner 120 is in engagement with the inboard end 144 of the guide ramp 140. So that the outboard portion 122 of the headliner 120 simultaneously engages the pillar trim component 130 and the guide ramp 140, the thickness of the outboard portion 122 of the headliner 120 can be equal to or slightly greater than the distance between the pillar trim component 130 and the guide ramp 140, where the term slightly greater indicates that the width of the headliner exceeds the distance between the pillar trim component 130 and the guide ramp 140 by an amount that does not prevent the outboard portion 122 of the headliner 120 from being disposed between the pillar trim component 130 and the guide ramp 140. For example, the outboard portion 122 of the headliner 120 can be greater in thickness by a distance by which the headliner 120 can be compressed and/or a distance by which the pillar trim component 130 and/or the guide ramp 140 can deflect.

By disposing the outboard portion 122 of the headliner 120 between the guide ramp 140 and the pillar trim component 130, a butt joint 160 is defined by the headliner 120 and the pillar trim component. At the butt joint 160, the outer surface 128 of the headliner 120 and the inboard surface 132 of the pillar trim component 130 are aligned with respect to one another and substantially flush with respect to one another to define a substantially flush surface across the butt joint 160. Substantially flush, as used herein, means that two surfaces are in alignment with one another, but allows for minor surface deviations at the joint between the two surfaces, as in the illustrated example of FIG. 2.

Figure 3:
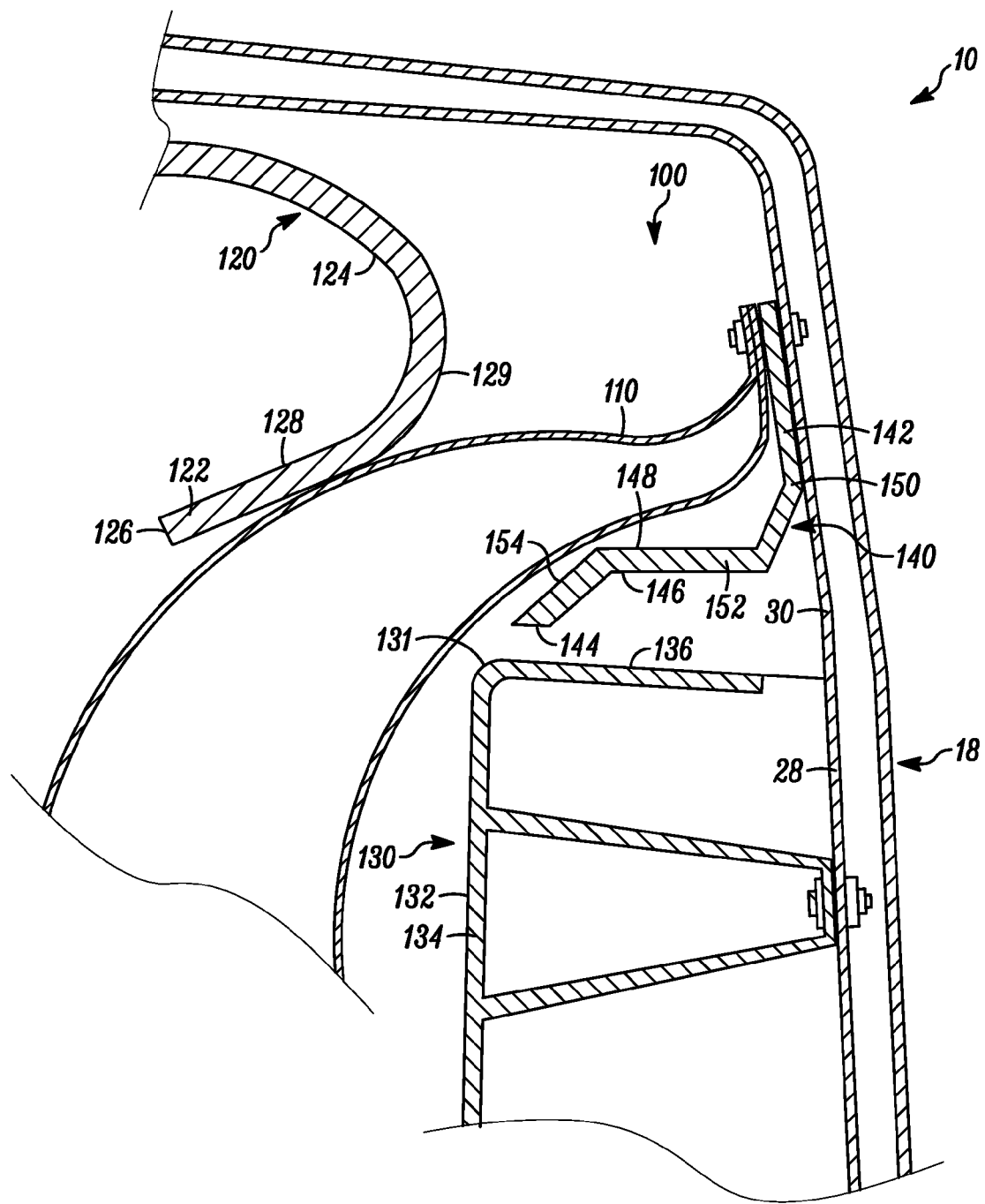
FIG. 3 is a front sectional view of the vehicle of FIG. 1 showing an inflatable curtain portion of the curtain airbag module in a post-deployment deployed configuration.

Upon deployment of the inflatable curtain portion 110 of the curtain airbag module 100, an inflation gas fills the inflatable curtain portion 110 and causes expansion of the inflatable curtain portion 110, as shown in FIG. 3. Expansion of the inflatable curtain portion 110 causes the inflatable curtain portion 110 to engage the headliner 120. The force exerted upon the inner surface 129 of the headliner 120 dislodges the outboard portion 122 from its former position between the pillar trim component 130 and the guide ramp 140, which separates the headliner 120 from the pillar trim component 130. With the headliner 120 separated from the pillar trim component 130, the guide ramp 140 guides the inflatable curtain portion 110 past the pillar trim component 130 such that at least part of the inflatable curtain portion 110 is disposed inboard with respect to the inboard surface 132 of the pillar trim component 130. During deployment of the inflatable curtain portion 110 and while the inflatable curtain portion 110 is in the deployed configuration, at least a portion of the guide ramp 140 engages the inflatable curtain portion 110 to allow smooth deployment of the inflatable curtain portion 110 without interference from the pillar trim component 130. For example, the ramp portion 154 of the guide ramp 140 can engage the inflatable curtain portion 110, both during and after deployment of the inflatable curtain portion 110. Thus, at least a portion of the inflatable curtain portion 110 of the curtain airbag module can extend along the guide ramp 140 when the inflatable curtain portion is in the deployed configuration.

Figure 4:
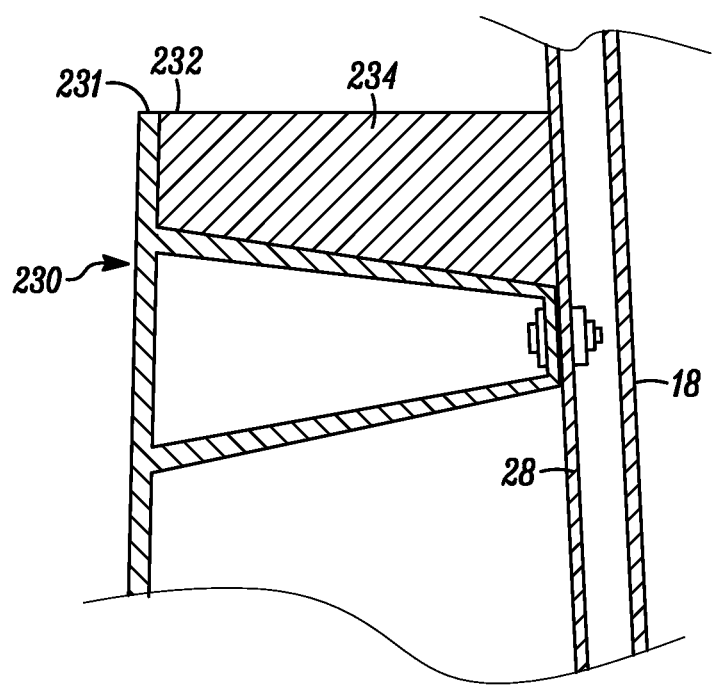
FIG. 4 is a front sectional view showing an alternative pillar trim panel.

As previously described, prior to deployment of the inflatable curtain portion 110, the outboard portion 122 of the headliner 120 is in engagement with the end wall 136 of the pillar trim component 130 which provides a substantially planar surface for engagement of the pillar trim component 130 with respect to the outer surface 128 of the headliner 120. It should be understood, however, that other pillar trim component configurations can be provided that provide a substantially planar surface for engagement with the headliner 120. For example, as shown in FIG. 4, an alternative pillar trim component 230 has an opening 232 disposed at an upper end 231 thereof and has a filler member 234 disposed within the opening 232. The filler member 234 can be a block of material of any type suitable to engage the outboard portion 122 of the headliner 120 prior to deployment of the inflatable curtain portion 110, while the inflatable curtain portion 110 is disposed in the stowed configuration. For example, the filler member 234 can be a block of foam or plastic material.

Figure 5A:
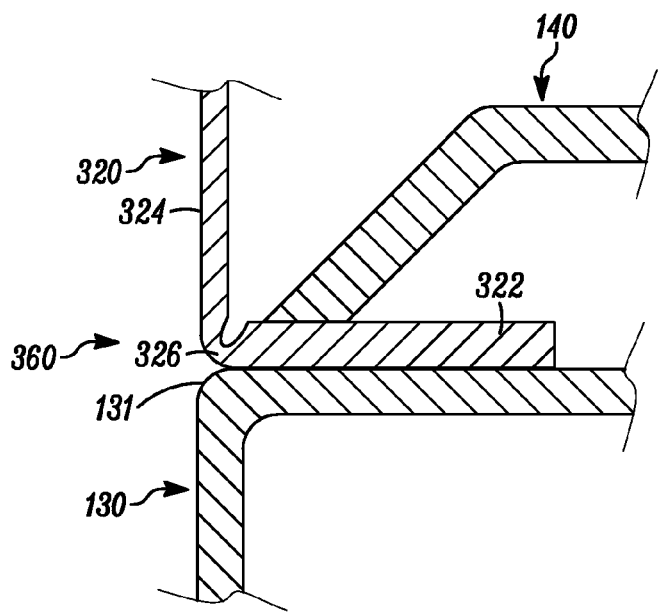
FIGS. 5A-5B are front sectional views showing a first alternative headliner prior to and during deployment of the inflatable curtain portion of the curtain airbag module.
Figure 5B:
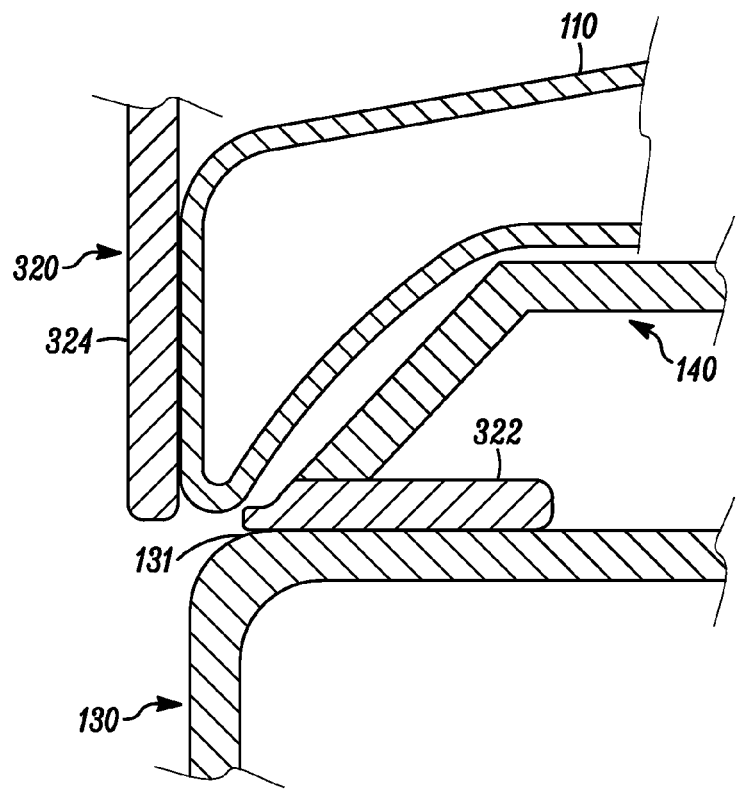

In the previous examples, the outboard portion 122 of the headliner 120 is removed from engagement between the pillar trim component 130 and the guide ramp 140 during deployment of the inflatable curtain portion 110. In an alternative implementation, as shown in FIGS. 5A-5B, an alternative headliner 320 includes an outboard portion 322 and a body portion 324. The outboard portion 322 and the body portion 324 are connected to one another by a frangible portion 326. The frangible portion 326 is an area of the headliner 320 that is configured to fail, such as by breaking or separating, when pressure is applied to the headliner 320 by the inflatable curtain portion 110. As an example, the frangible portion 326 can be an area of the headliner along which the material thickness of the headliner 320 is reduced. Other structures can be utilized, such as by incorporating different materials at the frangible portion 326 relative to the remainder of the headliner 320 or by weakening the material of the headliner 320 at the frangible portion 326 by any suitable method. Accordingly, during deployment of the inflatable curtain portion 110 of the curtain airbag module 100, the body portion 324 of the headliner 320 separates from the outboard portion 322 of the headliner 320 at the frangible portion 326, leaving the outboard portion 322 of the headliner 320 sandwiched between the guide ramp 140 and the pillar trim component 130.

Figure 6A:
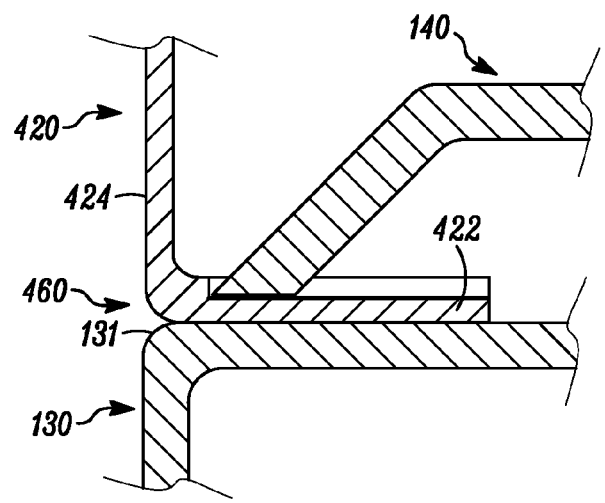
FIGS. 6A-6B are front sectional views showing a second alternative headliner prior to and during deployment of the inflatable curtain portion of the curtain airbag module.
Figure 6B:
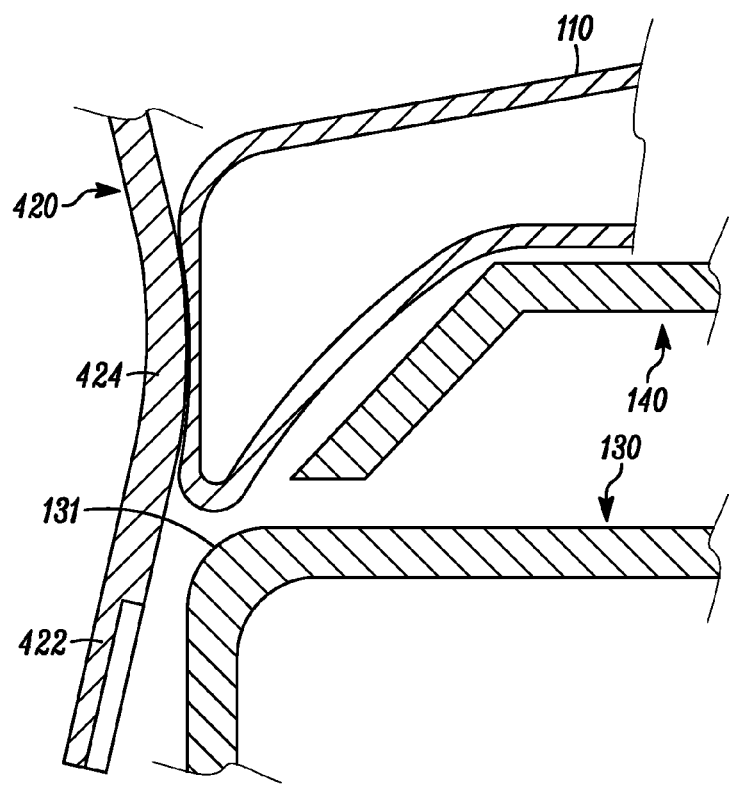

In a further alternative implementation, as shown in FIGS. 6A-6B, a second alternative headliner 420 includes an outboard portion 422 and a body portion 424. The thickness of the headliner 420 can taper at the outboard portion 422 relative to the body portion 424. Thus, the body portion 424 of the headliner 420 can have a first thickness, and the outboard portion 422 of the headliner 420 can have a second thickness that is smaller than the first thickness. In addition, the outboard portion 422 of the headliner can extend along a limited longitudinal length in the front-to-rear direction of the vehicle 10, wherein the longitudinal length of the outboard portion 422 is complementary to the longitudinal length of the B-pillar 18 of the vehicle 10. Upon deployment of the inflatable curtain portion 110 of the curtain airbag module 100, the inflatable curtain portion 110 engages the headliner 420. Engagement of the inflatable curtain portion 110 with the headliner 420 causes the headliner 420 to move with respect to the guide ramp 140 such that the outboard portion 422 is dislodged and separated from the guide ramp 140 and the pillar trim component 130. The inflatable curtain portion 110 is then free to move between the headliner 420 and the guide ramp 140 toward the deployed configuration. The guide ramp 140 then guides the inflatable curtain portion 110 past the pillar trim component 130 in the manner previously described.

While the description herein is made with respect to specific implementations, it is to be understood that the invention is not to be limited to the disclosed implementations but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An inflatable restraint assembly, comprising:
a vehicle pillar;
a pillar trim component that is attached to the vehicle pillar, the pillar trim component having an upper end;
a curtain airbag module having an inflatable curtain portion that is disposed in a stowed configuration prior to deployment and moves to a deployed configuration subsequent to deployment;
a guide ramp that is disposed between the inflatable curtain portion of the curtain airbag module and the upper end of the pillar trim component; and
a headliner having an outboard portion that is sandwiched between the guide ramp and the upper end of the pillar trim component prior to deployment of the inflatable curtain portion of the curtain airbag module, wherein a body portion of the headliner is connected to the outboard portion of the headliner by a frangible portion, such that the outboard portion of the headliner separates from the body portion of the headliner at the frangible portion during deployment of the inflatable curtain portion of the curtain airbag module.

2. The inflatable restraint assembly of claim 1, wherein a butt joint is formed by the headliner and the upper end of the pillar trim component prior to deployment of the inflatable curtain portion of the curtain airbag module and at least a portion of the headliner and at least a portion of the pillar trim component cooperate to define a substantially flush surface across the butt joint.

3. The inflatable restraint assembly of claim 1, wherein the pillar trim component includes a substantially planar surface that faces the guide ramp and engages the headliner prior to deployment of the inflatable curtain portion of the curtain airbag module.

4. An inflatable restraint assembly, comprising:
a vehicle pillar;

a pillar trim component that is attached to the vehicle pillar, the pillar trim component having an upper end;

a curtain airbag module that is located adjacent to the upper end of the pillar trim component, the curtain airbag module having an inflatable curtain portion that is disposed in a stowed configuration prior to deployment and moves to a deployed configuration subsequent to deployment;

a guide ramp that is positioned adjacent to the vehicle pillar and is disposed between the inflatable curtain portion of the curtain airbag module and the upper end of the pillar trim component; and a headliner that conceals the inflatable curtain portion of the curtain airbag module when the inflatable curtain portion is in the stowed configuration and is separated from the upper end of the pillar trim component when the inflatable curtain portion of the curtain airbag module is in the deployed configuration, wherein the headliner includes an outboard portion that is disposed between and in engagement with the guide ramp and the upper end of the pillar trim component such that the guide ramp and the upper end of the pillar trim component cooperate to restrain movement of the outboard portion of the headliner prior to deployment of the inflatable curtain portion of the curtain airbag module, wherein a body portion of the headliner is connected to the outboard portion of the headliner by a frangible portion, such that the outboard portion of the headliner separates from the body portion of the headliner at the frangible portion during deployment of the inflatable curtain portion of the curtain airbag module.

5. The inflatable restraint assembly of claim 4, wherein the pillar trim component includes an end wall that faces the guide ramp.

6. The inflatable restraint assembly of claim 4, wherein the pillar trim component includes an outer wall and a filler member that is positioned between the outer wall and the vehicle pillar, and the filler member is engageable with the outboard portion of the headliner prior to deployment of the inflatable curtain portion of the curtain airbag module.

7. The inflatable restraint assembly of claim 4, wherein the vehicle pillar has an upper portion and a lower portion, the pillar trim component conceals the lower portion of the vehicle pillar, and the inflatable curtain portion of the curtain airbag module is located adjacent to the upper portion of the vehicle pillar.

8. The inflatable restraint assembly of claim 4, wherein the guide ramp extends from an outboard end that is connected to the vehicle pillar to an inboard end that is in engagement with the headliner prior to deployment of the inflatable curtain portion of the curtain airbag module.

9. The inflatable restraint assembly of claim 8, wherein the outboard end of the guide ramp is spaced from the upper end of the pillar trim component by a first distance, the inboard end of the guide ramp is spaced from the pillar trim component by a second distance, and the first distance is greater than the second distance.

10. The inflatable restraint assembly of claim 4, wherein the guide ramp includes an outboard support portion that is connected to the vehicle pillar, an inboard support portion that extends inboard from the outboard support portion, and a ramp portion that extends inboard from the inboard support portion and is angled with respect to the inboard support portion toward the upper end of the pillar trim component, wherein the ramp portion guides the inflatable curtain portion of the curtain airbag module past the pillar trim component during deployment of the inflatable curtain portion of the curtain airbag module.

11. The inflatable restraint assembly of claim 4, wherein a butt joint is formed by the headliner and the upper end of the pillar trim component prior to deployment of the inflatable curtain portion of the curtain airbag module and at least a portion of the headliner and at least a portion of the pillar trim component cooperate to define a substantially flush surface across the butt joint.

12. An inflatable restraint assembly, comprising:

a vehicle pillar having an upper portion and a lower portion;

a pillar trim component that is attached to the vehicle pillar and conceals the lower portion of the vehicle pillar, the pillar trim component having an upper end with an upper surface;

a curtain airbag module that is located adjacent to the upper end of the pillar trim component, the curtain airbag module having an inflatable curtain portion that is disposed in a stowed configuration prior to deployment and moves to a deployed configuration subsequent to deployment;

a guide ramp that is disposed between the inflatable curtain portion of the curtain airbag module and the upper end of the pillar trim component, the guide ramp having an outboard end that is connected to the vehicle pillar, an inboard end, and a lower surface extending from the outboard end to the inboard end with a cavity defined between the lower surface of the guide ramp and the upper surface of the upper end of the pillar trim component, wherein at least a portion of the inflatable curtain portion of the curtain airbag module extends along the guide ramp when the inflatable curtain portion is in the deployed configuration; and a headliner that conceals the inflatable curtain portion of the curtain airbag module when the inflatable curtain portion is in the stowed configuration and is separated from the upper end of the pillar trim component when the inflatable curtain portion of the curtain airbag module is in the deployed configuration, wherein the headliner includes an outboard portion that is disposed within the cavity with a distal end of the outboard portion positioned outboard of the inboard end of the guide ramp, the outboard portion being in engagement with the inboard end of the guide ramp and the upper end of the vehicle pillar prior to deployment of the inflatable curtain portion of the curtain airbag module, and a body portion of the headliner is connected to the outboard portion of the headliner by a frangible portion, such that the outboard portion of the headliner separates from the body portion of the headliner at the frangible portion during deployment of the inflatable curtain portion of the curtain airbag module.

13. The inflatable restraint assembly of claim 12, wherein the outboard end of the guide ramp is spaced from the upper end of the pillar trim component by a first distance and the inboard end of the guide ramp is spaced from the pillar trim component by a second distance, and the first distance is greater than the second distance.

14. The inflatable restraint assembly of claim 12, wherein the guide ramp has an upper surface that engages the inflatable curtain portion of the curtain airbag module in the deployed configuration, and a portion of the lower surface of the guide ramp at the inboard end engages the headliner prior to deployment of the inflatable curtain portion of the curtain airbag module.

15. The inflatable restraint assembly of claim 12, wherein the upper surface of the upper end of the pillar trim component is a substantially planar surface that faces the guide ramp and engages the headliner prior to deployment of the inflatable curtain portion of the curtain airbag module.

16. The inflatable restraint assembly of claim 15, wherein the upper surface of the pillar trim component is defined by an end wall of the pillar trim component.

17. The inflatable restraint assembly of claim 15, wherein the upper surface of the pillar trim component is defined by a filler member that is positioned between the vehicle pillar and an outer wall of the pillar trim component.

18. The inflatable restraint assembly of claim 12, wherein the outboard portion of the headliner remains in the cavity upon separation of the outboard portion from the body portion.

19. The inflatable restraint assembly of claim 12, wherein a butt joint is formed by the headliner and the upper end of the pillar trim component prior to deployment of the inflatable curtain portion of the curtain airbag module, and at least a portion of the headliner and at least a portion of the pillar trim component cooperate to define a substantially flush surface across the butt joint.

* * * * *